(12) United States Patent
Murakami

(10) Patent No.: US 7,155,594 B2
(45) Date of Patent: Dec. 26, 2006

(54) METHOD, COMPUTER SYSTEM, AND RELAY DEVICE FOR DATA TRANSFER AMONG PLURAL MEMORIES TO REDUCE THE NUMBER OF MEMORY DEVICES WITH RELATIVELY SMALL STORAGE CAPACITY

(75) Inventor: Toshihiko Murakami, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 391 days.

(21) Appl. No.: 10/663,732

(22) Filed: Sep. 17, 2003

(65) Prior Publication Data
US 2004/0205145 A1    Oct. 14, 2004

(30) Foreign Application Priority Data
Feb. 17, 2003  (JP)  ............................. 2003-038097

(51) Int. Cl.
*G06F 12/00* (2006.01)
(52) U.S. Cl. ....................................... 711/170; 711/165
(58) Field of Classification Search .................... None
See application file for complete search history.

(56) References Cited

U.S. PATENT DOCUMENTS

| | | | |
|---|---|---|---|
| 5,787,487 A | 7/1998 | Hashimoto et al. | |
| RE36,989 E | 12/2000 | White | |
| 6,343,324 B1 * | 1/2002 | Hubis et al. ................ | 709/229 |
| 6,453,403 B1 * | 9/2002 | Czajkowski ................ | 711/170 |
| 6,557,073 B1 | 4/2003 | Fujiwara et al. | |
| 6,567,889 B1 | 5/2003 | DeKoning et al. | |
| 6,618,798 B1 * | 9/2003 | Burton et al. ............... | 711/202 |
| 6,694,406 B1 * | 2/2004 | Kodama et al. ............ | 711/114 |
| 6,718,372 B1 | 4/2004 | Bober | |
| 6,971,016 B1 * | 11/2005 | Barnett ....................... | 713/182 |
| 2002/0054321 A1 * | 5/2002 | Kikuchi ..................... | 358/1.15 |
| 2002/0156984 A1 * | 10/2002 | Padovano ................... | 711/148 |
| 2002/0161941 A1 * | 10/2002 | Chue et al. ................. | 710/22 |
| 2003/0061220 A1 * | 3/2003 | Ibrahim et al. ............. | 707/10 |
| 2003/0177330 A1 | 9/2003 | Idei et al. | |
| 2003/0182501 A1 | 9/2003 | George et al. | |
| 2003/0221063 A1 | 11/2003 | Eguchi et al. | |
| 2004/0030822 A1 | 2/2004 | Rajan et al. | |

(Continued)

FOREIGN PATENT DOCUMENTS

JP    3288934    12/1991

(Continued)

OTHER PUBLICATIONS

"Virtualization of Disk Storage", (WP-0007-1), Sep. 2000, Evaluator Group, Inc.

*Primary Examiner*—Mano Padmanabhan
*Assistant Examiner*—Craig E Walter
(74) *Attorney, Agent, or Firm*—Mattingly, Stanger, Malur & Brundidge, P.C.

(57) ABSTRACT

When destinations of memory devices constituting one virtual volume increase, a relay device performs data transfer among plural memory devices such that a structure of the virtual volume can be changed so as to reduce the destinations of the memory devices as much as possible with this increase in the destinations as an opportunity for data transfer. In addition, when memory areas with a relatively small capacity increase among unused memory areas in which a virtual volume is not constituted, the relay device performs data transfer among the plural memory devices such that the number of the memory areas with a small capacity is reduced as much as possible with this increase in the memory areas as an opportunity for data transfer.

18 Claims, 17 Drawing Sheets

U.S. PATENT DOCUMENTS

2004/0064633 A1    4/2004  Oota
2004/0068561 A1*   4/2004  Yamamoto et al. ......... 709/224
2004/0098537 A1    5/2004  Serizawa
2004/0103244 A1    5/2004  Fujimoto et al.
2004/0103261 A1    5/2004  Honda et al.

FOREIGN PATENT DOCUMENTS

WO    WO 01/80013    * 10/2001

* cited by examiner

METHOD, COMPUTER SYSTEM, AND RELAY DEVICE FOR DATA TRANSFER AMONG PLURAL MEMORIES TO REDUCE THE NUMBER OF MEMORY DEVICES WITH RELATIVELY SMALL STORAGE CAPACITY

BACKGROUND OF THE INVENTION

The present invention relates to a virtualization technique for virtualizing the use of memory areas of plural memory devices, and, more particularly, the invention relates to a method of transferring data among memory devices or in a memory device.

In a Storage Area Network (SAN), which employs a technique for connecting plural computers and plural memory devices through a network, there is a technique for virtualizing the use of memory areas of the memory devices (e.g., see "Virtualization of Disk Storage (September 2000)", which is a technology white paper of the Evaluator Group, Inc.

There are several methods of virtualization depending upon the position between a computer and & memory device where virtualization is performed.

A first method is a method in which virtualization is performed by storage management software or volume management software in a computer in which a server application is executed.

A second method is a method in which a computer having plural interfaces connecting a memory device is placed in front of the memory device to perform virtualization, or the memory device itself performs virtualization.

A third method is a method with which virtualization is performed in a network apparatus or a management server apparatus constituting the SAN. This method is classified into an in-band method of handling a control I/O (Input/Output) and a data I/O in the same network and an out-of-band method of separately providing a network for flow of the control I/O, to handle the control I/O separately from the data I/O.

SUMMARY OF THE INVENTION

In the second or third method of virtualization described above, a virtualized memory area (virtual volume) is provided by a relay device, such as a LAN switch, in the case of constituting an SAN using an Internet small computer system interface (iSCSI) in a fiber channel switch or the Ethernet (registered trademark), and an apparatus of a server base including plural host bus adaptors (HBAs) of a fiber channel or the Ethernet (registered trademark). In such a case, if the virtual volume is constituted by a combination of memory areas of plural memory devices, depending upon the state of access of the virtual volume, a memory device of a destination to be accessed changes one after another among the plural memory devices, for example, a first memory device, a second memory device, and a third memory device. As a result, there is a problem in that the relay processing load increases.

It is a first object of the present invention to provide a method of reducing the relay processing load by performing data transfer during operation, such that the virtual volume is constituted by memory areas of a relatively small number of memory devices.

In addition, it is possible that, if the virtual volume is constituted by memory areas of plural memory devices in order to increase or decrease areas whenever necessary, the number of unused memory areas with a relatively small capacity may increase. If the virtual volume is constituted by a large number of memory areas with a small capacity, the processing load of conversion processing in associating the virtual volume in the relay device with an actual memory area increases.

Further, there is also a problem in that a relatively large virtual volume cannot be constituted by a relatively small number of unused memory areas.

A second object of the present invention is to provide a method of reducing this problem by performing data transfer during operation, for example, from one or more memory areas already constituting the virtual volume to another memory area such that the number of unused memory areas with a relatively small capacity is reduced.

The present invention examples a data transfer method in a computer system including: plural computers; plural memory devices; a relay device which connects the computers and the memory devices; and a management device which manages the computers, the memory devices, and the relay device, wherein the management device sets virtual memory areas of the memory devices for the plural computers and holds information on contents of the setting as first information, the relay device holds second information which is created based upon the first information, the virtual memory areas correspond to memory areas in respective memory areas or a memory area formed by combining memory areas in the plural memory devices, and the relay device selects one virtual memory area from the second information and, in the case where the selected virtual memory area is a memory area formed by combining the memory areas in the plural memory devices as an opportunity for data transfer, performs data transfer among the number of plural memory devices to reduce the memory devices involved in the combination.

In addition, the relay device refers to the second information and, in the case in which the number of memory areas with a relatively small capacity not corresponding to the virtual memory areas increases as an opportunity for data transfer, performs data transfer among the plural memory devices to reduce the number memory areas with a relatively small capacity not corresponding to the virtual memory areas.

DESCRIPTION OF THE PREFERRED EMBODIMENTS

A first embodiment of the present invention will be described with reference to FIGS. 1 to 13. In the first embodiment, a case will be considered in which data transfer is performed during operation, such that the virtual volume is constituted by memory areas of a relatively small number of memory devices.

Figure 1:
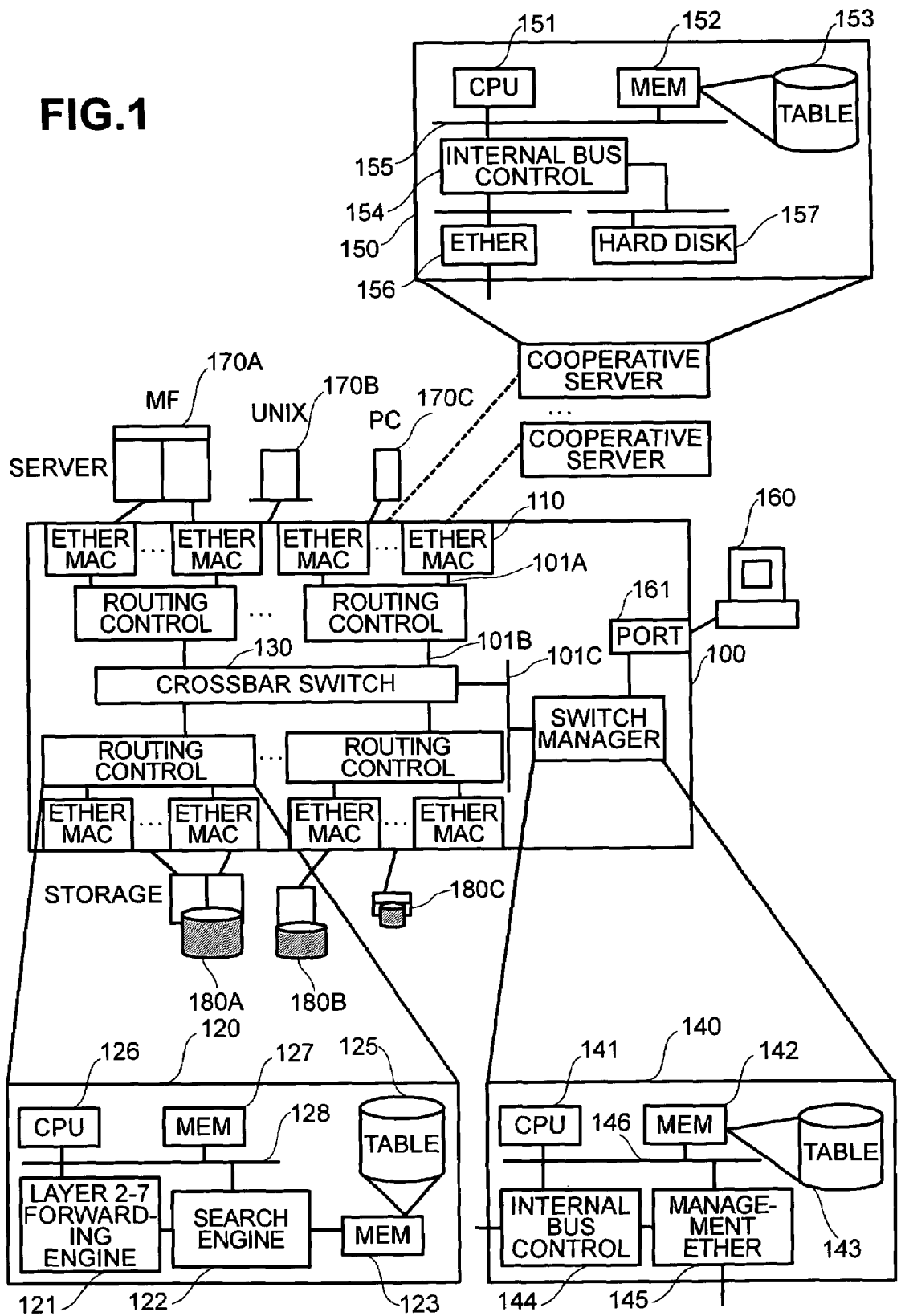
FIG. 1 is a block diagram showing an example of the structure of a computer system.

FIG. 1 is a block diagram showing an example of the structure of a computer system in accordance with the present invention. In this regard, the server apparatuses 170 (170A, 170B, 170C) are connected to storage devices 180 (180A, 180B, 180C) via a switch 100. Although the switch 100 may be a fiber channel switch or a LAN switch, an Ethernet (registered trademark) switch is described as an example of a relay device in the following description of the embodiments of the present invention.

The switch 100 includes: plural connection interfaces 110 (represented as Ether MACs in FIG. 1) which perform control of a physical layer and a data link layer for connecting the server apparatuses 170, storage devices 180, or the like; plural routing control sections (routing controls) 120 which effect determination of a connection interface to be a destination and effect conversion of the contents of a packet, if necessary, based upon information of a header or an information part of a layer 2 or upper layers of a packet to be sent and received (layers up to a layer 7 are shown in the figure); a crossbar switch 130 which connects the plural routing controls; a switch management section (switch manager) 140 which performs device management of the switch 100 and calculation of a path control protocol; and an internal communication line 101C, such as an internal bus, which connects the crossbar switch 130 and the switch manager 140.

The routing control 120 includes: a CPU 126; a main memory (MEM) 127 for storing programs and tables; a forwarding control section for forwarding packets from the layer 2 to the layer 7 (layer 2–7 forwarding engine) 121; a header search section (search engine) 122 for a packet; and a memory (HEM) 123 for storing a table 125. These components are connected by an internal communication line 128, such as an internal bus.

The switch manager 140 includes: a CPU 141; a main memory (HEM) 142 for storing programs and a table 143, such as a path control table; a management Ethernet (registered trademark) (Ether) 145; and an internal bus control 144 for making connection via the internal communication line 101C to the crossbar switch 130. These components are connected by an internal communication line 146, such as an internal bus.

Moreover, a management device 160 is connected to the switch 100 via a management console or a port 161 of the Ethernet (registered trademark). In addition, real volumes of storage devices 180 or plural cooperative servers 150 for performing functions, such as backup of a virtual volume provided by the switch 100 in cooperation with the switch 100, are connected to the switch 100 via the connection interfaces (Ether MACs) 110.

The cooperative server 150 includes: a CPU 151; a main memory (MEM) 152 for storing programs and a table 153, such as a volume management table; an Ethernet (registered trademark) (Ether) 156; and a hard disk 157. These components are connected by an internal communication line 155, such as an internal bus via an internal bus control 154.

Figure 2:
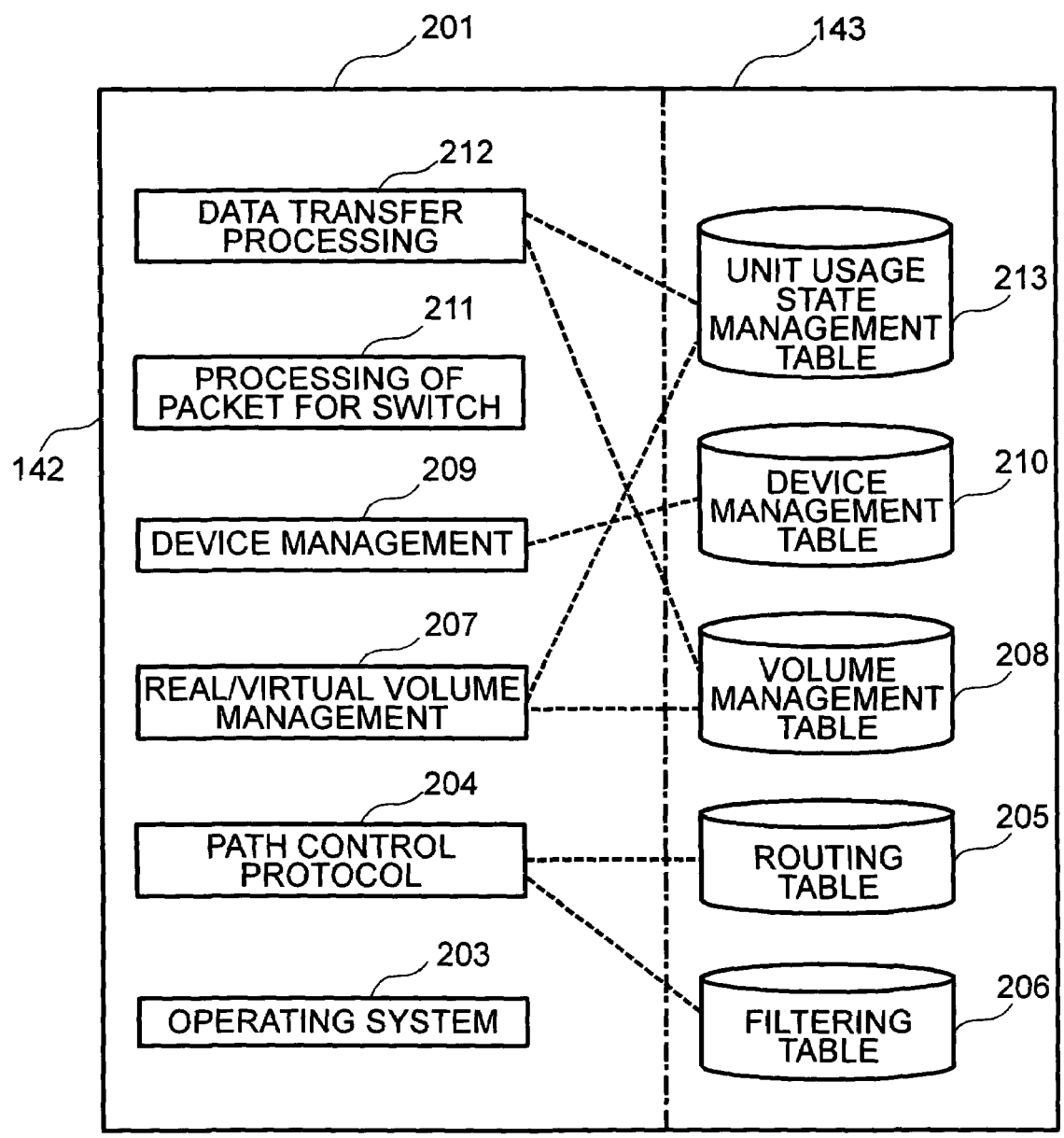
FIG. 2 is a block diagram showing an example of the structure of programs and tables which a switch manager of a switch has.

FIG. 2 is a diagram showing an example of the structure of programs and tables which are stored in the main memory 142 in the switch manager 140 of the switch 100.

A program area 201 of the main memory 142 includes: an operating system 203; a path control protocol 204; real/virtual volume management 207; device control 209; processing of packet for switch 211; and data transfer processing 212. A table area 143 includes: a routing table 205 and a filtering table 206 which are related to the path control protocol 204; a volume management table 208 related to the real/virtual volume management 207; a device management table 210 related to the device management 209; and a unit usage state management table 213. The device management table 210 is a table having recorded therein the types, structure information, performance information, and the like of connected devices and incorporated devices. Device management tables in FIGS. 4 and 5 are similar.

Figure 3:
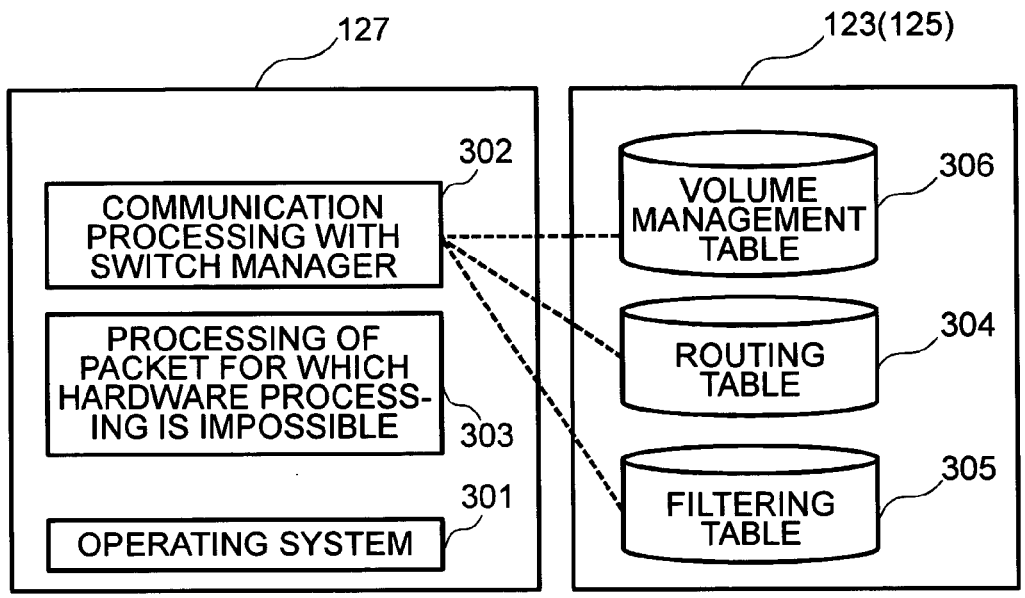
FIG. 3 is a block diagram showing an example of the structure of programs and tables which a routing control section of the switch has.

FIG. 3 is a diagram showing an example of the structure of programs and tables stored in the main memory 127 and the memory 123 (125) in the routing control 120 of the switch 100. The main memory 127 includes: an operating system 301; processing of packet for which hardware processing is impossible 303; and communication processing with the switch manager 302. The memory 125 includes: a routing table 304 related to the communication processing with the switch manager 302; a filtering table 305; and a volume management table 306.

Figure 4:
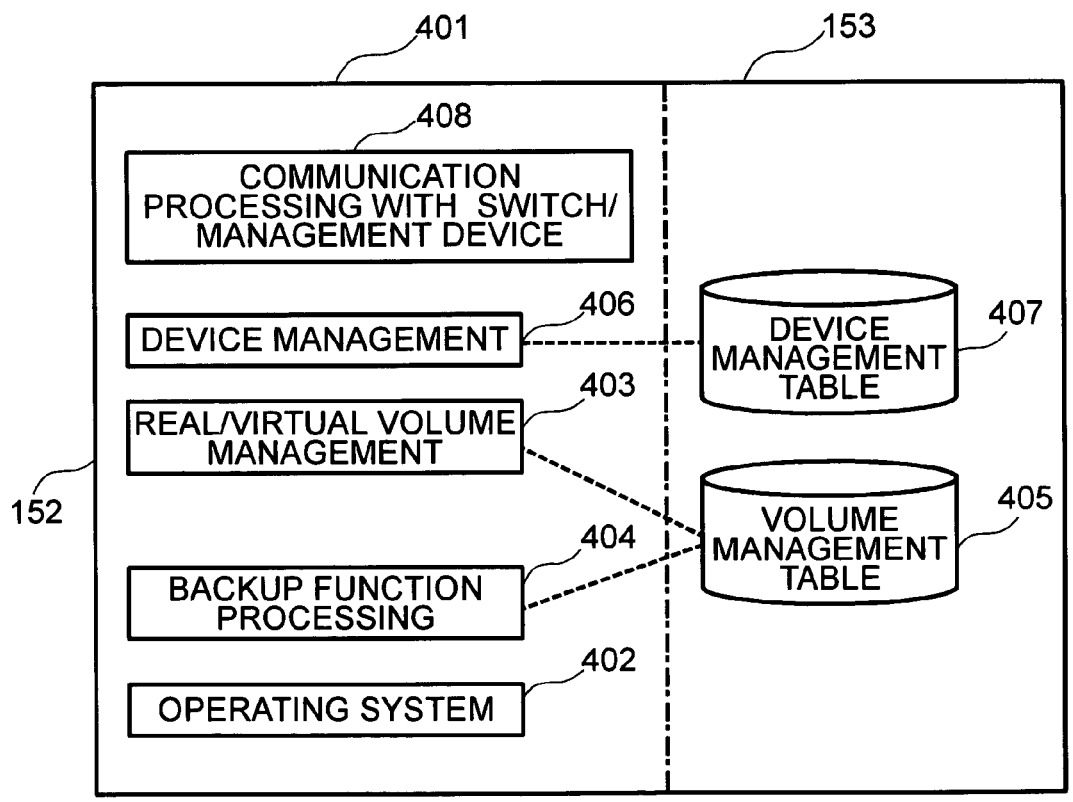
FIG. 4 is a block diagram showing an example of the structure of programs and tables which a cooperative server of the switch has.

FIG. 4 is a diagram showing an example of the structure of programs and tables stored in the main memory 152 of the cooperative server 150. A program area 401 of the main memory 152 includes: an operating system 402; real/virtual volume management 403; backup function processing 404; device management 406; and communication processing 408 for communicating with the switch or the management device. The table area 153 includes: a volume management table 405 related to the real/virtual volume management 403 and the backup function processing 404; and a device management table 407 related to the device management 406.

Figure 5:
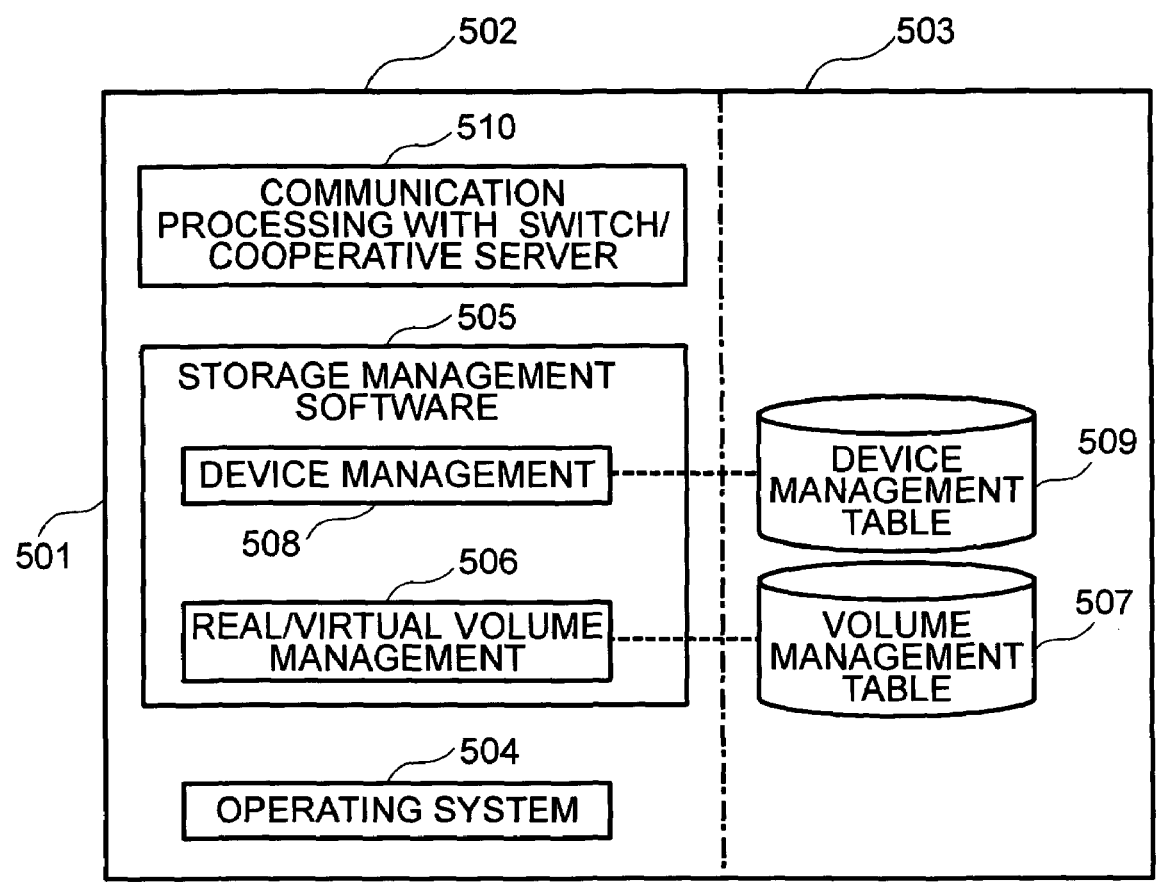
FIG. 5 is a block diagram showing an example of the structure of programs and tables which a management device of the computer system has.

FIG. 5 is a diagram showing an example of the structure of programs and tables stored in the management device 160. A program area 502 of a main memory 501 includes: an operating system 504, device management 508 and real/virtual volume management 506 serving as storage management software 505; and communication processing 510 for communicating with the switch or the cooperative server. A table area 503 includes a volume management table 507 related to the real/virtual volume management 506; and a device management table 509 related to the device management 508.

Figure 6:
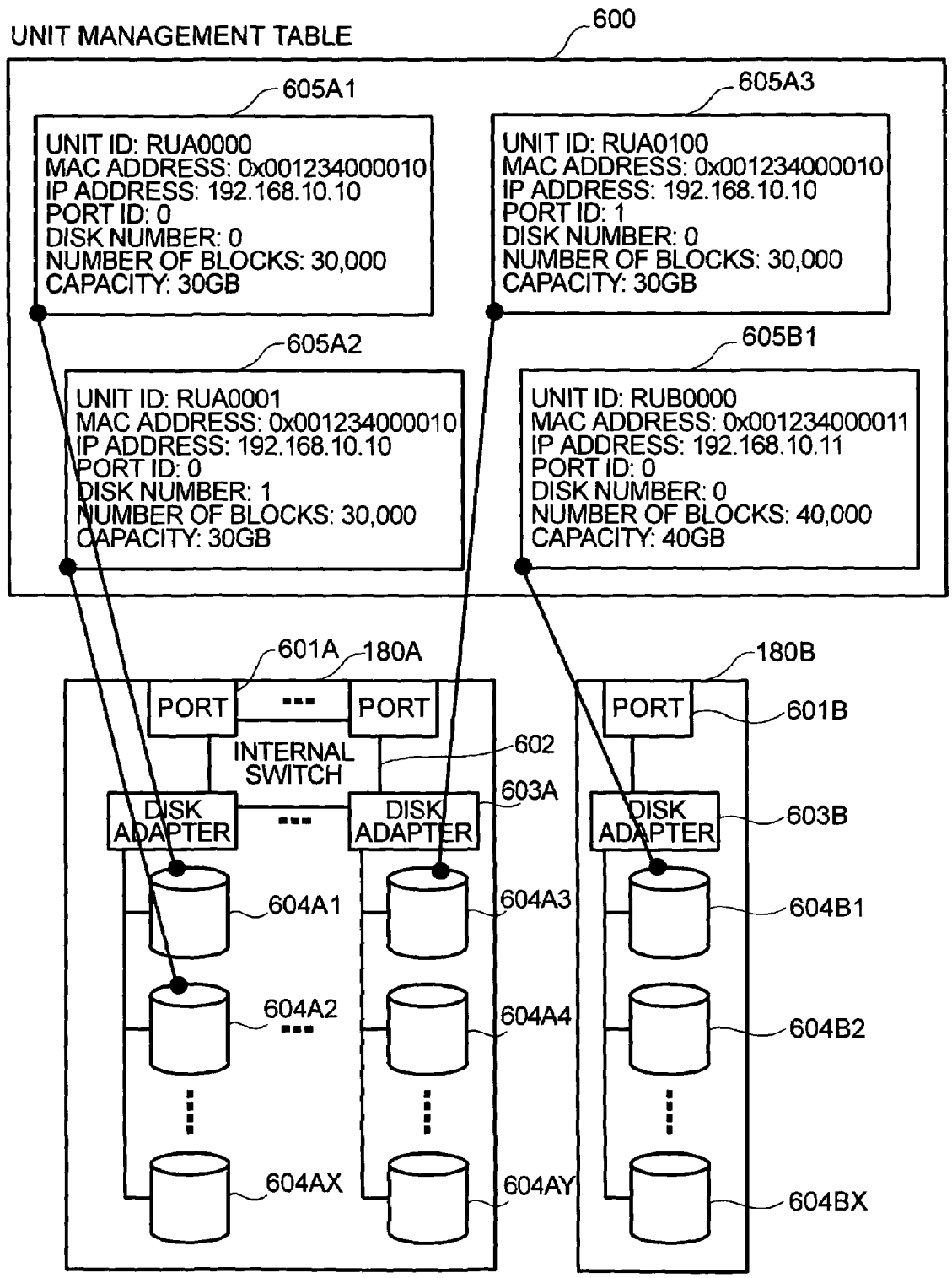
FIG. 6 is a block diagram showing an example of the structure of a unit and an example of the structure of a unit management table
Figure 7:
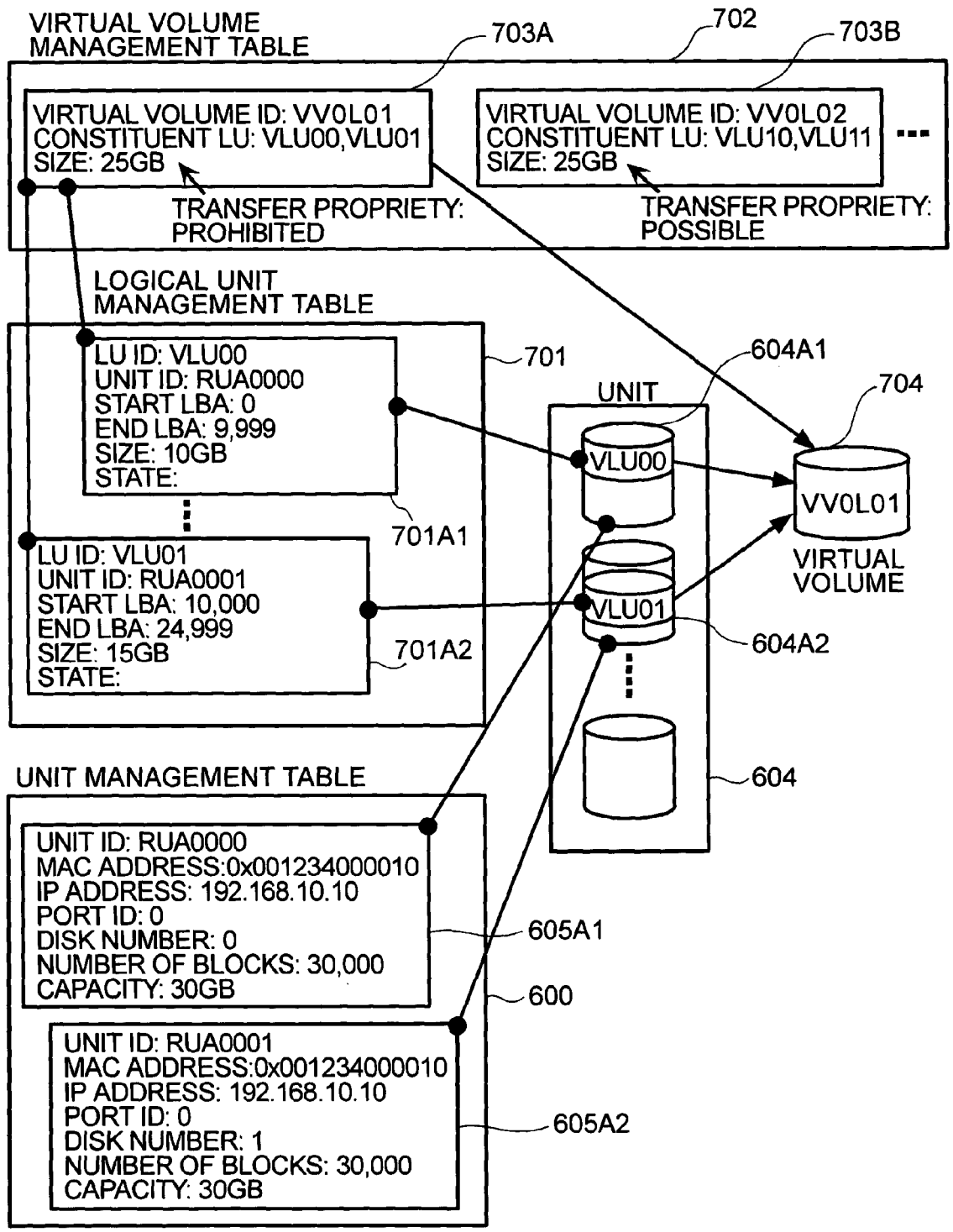
FIG. 7 is a block diagram showing an example of the structure of a logical unit management table and a virtual volume management table.
Figure 8:
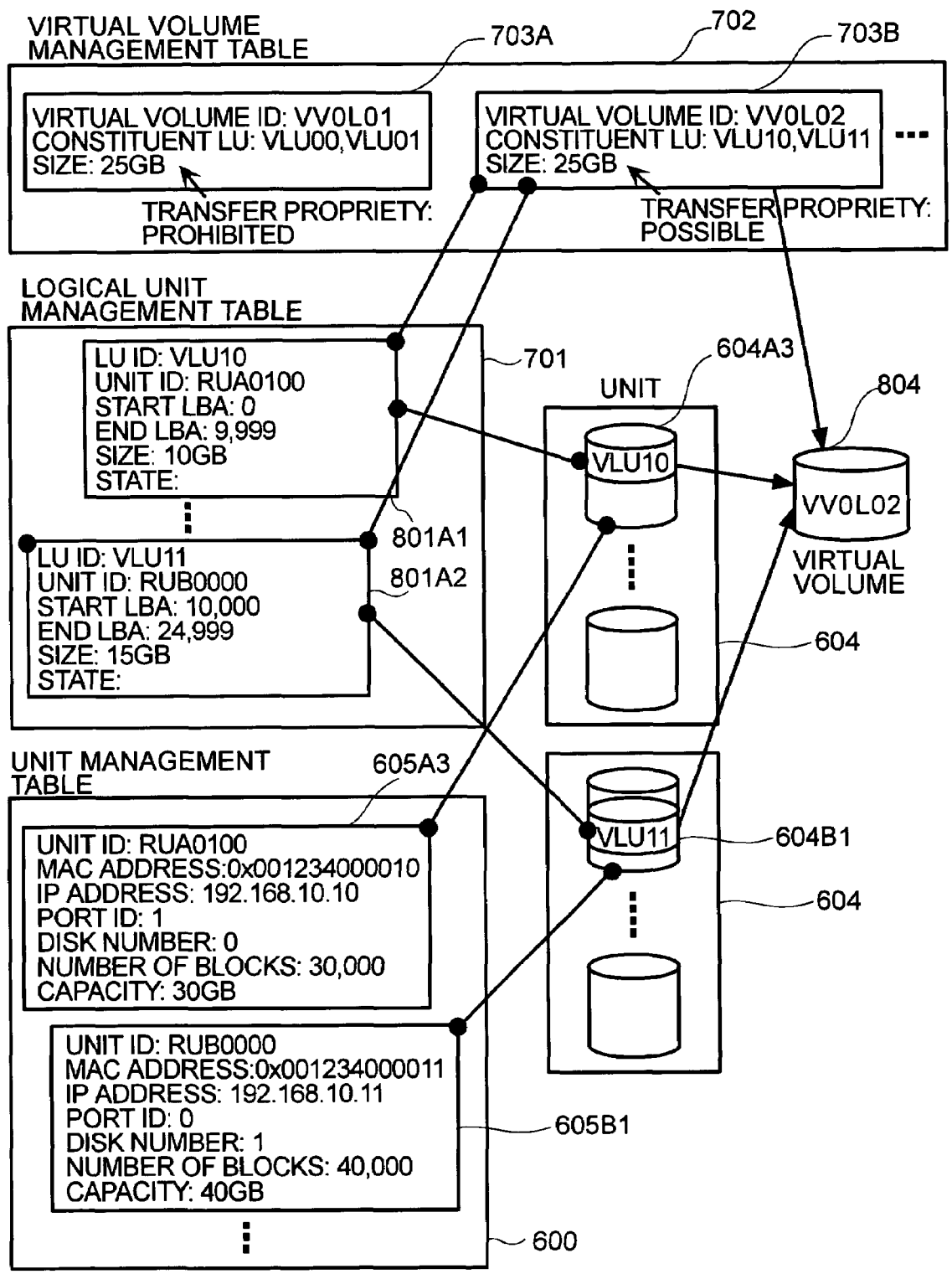
FIG. 8 is a block diagram showing an example of the structure of the logical unit management table and the virtual volume management table.

The volume management tables 208, 306, 405, and 507 shown in FIGS. 2 to 5 include a unit management table 600, a logical unit management table 701, and a virtual volume management table 702 shown in FIGS. 6 to 8.

An administrator of the computer system shown in FIG. 1 creates or updates the volume management table 507 with the management device 160 and distributes it to the volume management table 208 of the switch manager 140 of the switch 100 and the volume management table 405 of the cooperative server 150. The switch manager 140 distributes it to the volume management table 306 of the routing control 120.

FIG. 6 is a diagram showing an example of a structure of the unit management table 600.

The storage device 180 includes: plural connection ports 601 for making connection with the computer 170 or the switch 100; and disk adapters 603 for accessing plural disks 604. In the case in which there are plural connection ports 601 and plural disk adapters 603, each connection port and each disk adapter is connected by an internal switch 602.

The unit management table 600 includes plural entries 605. The entry 605 for each disk includes information, such as a unit ID, a media access control (MAC) address, an IP address, a port ID, a disk number, the number of blocks (in order to simplify explanation, one megabyte is assumed to be one block), and the capacity.

FIG. 7 is a diagram showing an example of the structure of a logical unit management table and a virtual volume management table.

A logical unit management table 701 includes plural entries 701A. The entry 701A for each logical unit includes information, such as a logical unit (LU) ID, the unit ID shown in FIG. 6, a start logical block address (LBA), an end LBA, a size, and a state.

A virtual volume management table 702 includes plural entries 703. The entry 703 for each virtual volume includes information, such as a virtual volume ID, a pair of constituent logical units (LUs), and a size and information indicating the propriety of transfer. The propriety of transfer is "prohibited" in an entry 703A and is "possible" in an entry 703B.

A virtual volume 704, shown as an example, is constituted as a combination of logical units with logical unit IDs of VLU00 and VLU01 as indicated by the entry 703A of the virtual volume table 702, and the propriety of transfer is "prohibited".

FIG. 8 is a diagram showing an example of the structure of a logical unit management table and a virtual volume management table, as shown in FIG. 7. A virtual volume 804 is constituted as a combination of logical units with logical unit IDs of VLU10 and VLU11 as indicated by an entry 703B of the virtual volume table 702, and the propriety of transfer is "possible".

The virtual volume of FIG. 7 includes disks 604 in the same storage device 180, and the virtual volume of FIG. 8 includes disks 604 in different storage devices 180. The data transfer method of the present invention performs data transfer in a case as shown in FIG. 8.

Figure 9:
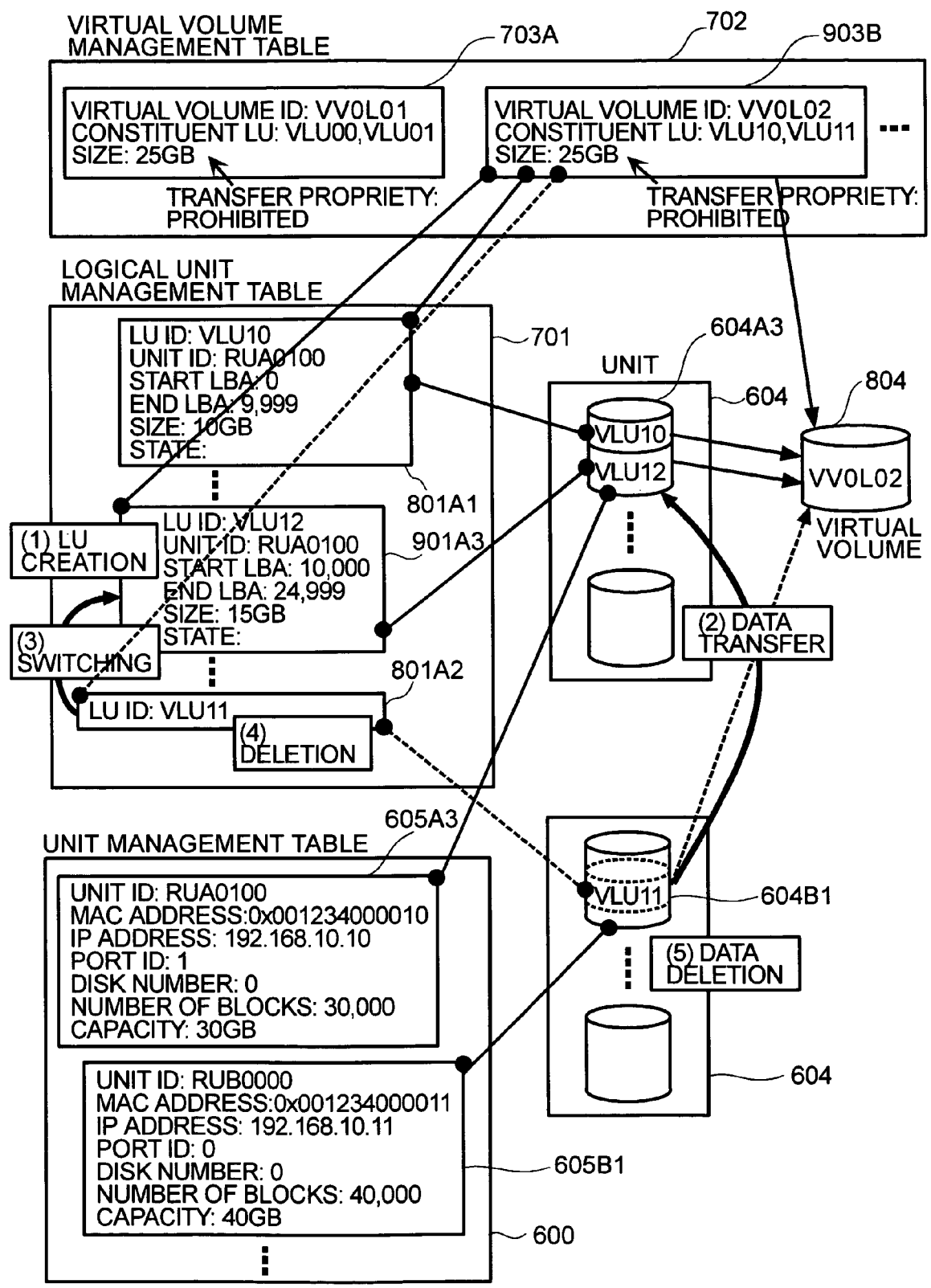
FIG. 9 is a block diagram showing an outline of the process of data transfer.

FIG. 9 is a diagram which will be referred to for explaining an outline of the processing in the case in which data transfer is performed in the virtual volume 804 of FIG. 8.

Figure 10:
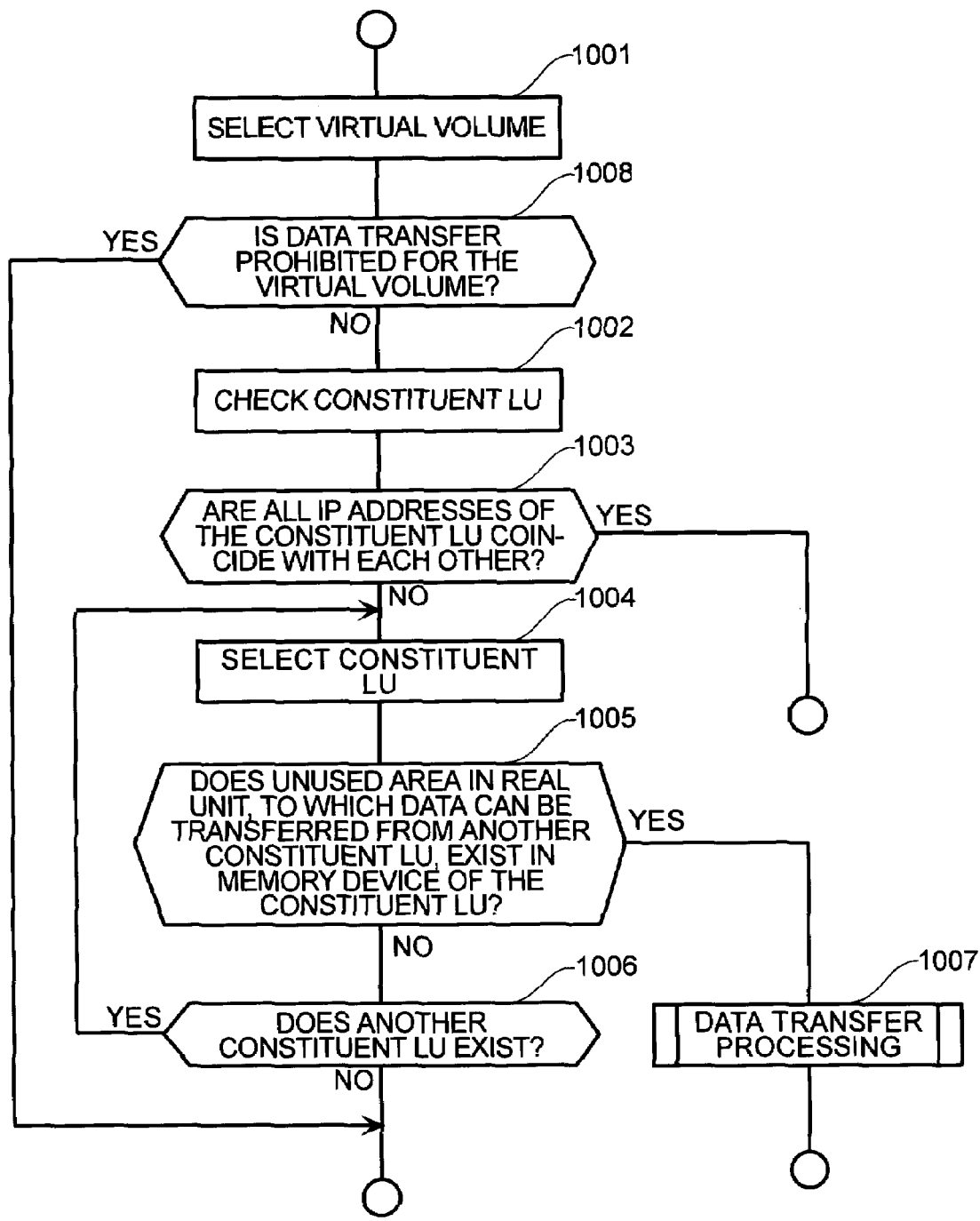
FIG. 10 is a process flow diagram showing an example of a the processing sequence for obtaining an opportunity for data transfer.

FIG. 10 is a diagram showing an example of a processing sequence for obtaining an opportunity for the data-transfer processing 212 of the switch manager 140 to perform data transfer.

In the processing sequence of FIG. 10, when the data transfer processing 212 selects a virtual volume, for example, the virtual volume 804 (step 1001), next, the data transfer processing 212 judges whether or not data transfer is prohibited for the selected virtual volume (step 1008). If a result of the judgment indicates that data transfer is prohibited, the data transfer processing 212 does not perform data transfer. If data transfer is not prohibited, the data transfer processing 212 proceeds to step 1002.

In step 1002, the data transfer processing 212 checks a constituent LU. In the case of the selected virtual volume 804, it is seen from the entry 703B of the virtual volume management table 702 that a constituted logical unit is a combination of VLU10 and VLU11.

In step 1003, the data transfer processing 212 judges whether or not all IP addresses of the constituent LU coincide with each other. If all of the IP addresses of the constituent LU coincide with each other, the data transfer processing 212 does not perform data transfer, and, if not, the processing proceeds to step 1004. In the case of the virtual volume 804, unit IDs are RUA0100 and RUB0000, respectively, according to entries 801A1 and 801A2 of the logical unit management table 701. Therefore, since all IP addresses do not coincide with each other according to the unit management table 600, the data transfer processing 212 proceeds to step 1004.

In step 1004, the data transfer processing 212 selects a constituent LU and proceeds to step 1005. Here, in the case of the virtual volume 804, it is assumed that a logical unit RUA0100 is selected.

In step 1005, the data transfer processing 212 judges whether or not an unused area in a real unit, to which data can be transferred from another constituent LU, exists in a memory device of the selected constituent LU. If an unused area exists, the data transfer processing 212 proceeds to step 1007, and, if not, the processing proceeds to step 1006. In the case of the virtual volume 804, since a logical unit RUA0100 is selected, and, as a result of the judgment of step 1005, an area to which data can be transferred from another constituent logical unit RUB0000 exists, the data transfer processing 212 proceeds to step 1007.

In step 1007, the data transfer processing 212 performs data transfer processing. In the case of virtual volume 804, the data transfer processing 212 transfers data of VLU11 in RUB0000 to RUA0100.

In step 1006, if there is another constituent LU, the data transfer processing 212 returns to step 1004, and, if not, the processing does not perform data transfer.

In the processing sequence shown in FIG. 10, data transfer may not be performed (in the case of YES in step 100.3) or it may not be able to be performed (in the case of NO in step 1006). In addition, in the processing sequence shown in FIG. 10, the start of the processing sequence may be instructed by an administrator from the management device 160 or the like, or it may be instructed according to a schedule of the storage management software 505.

Figure 11:
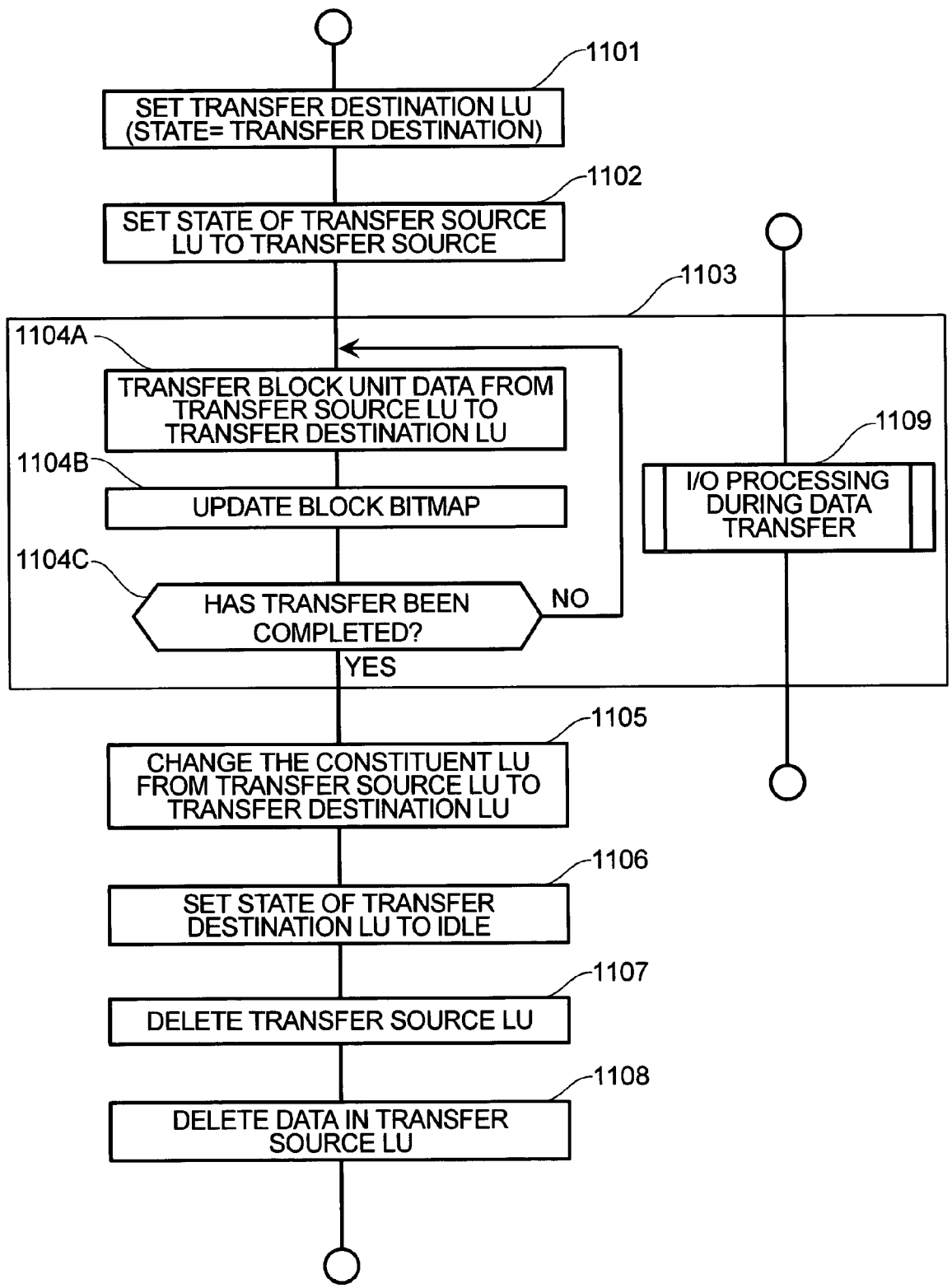
FIG. 11 is a block diagram showing an example of the processing sequence of data transfer.
Figure 12:
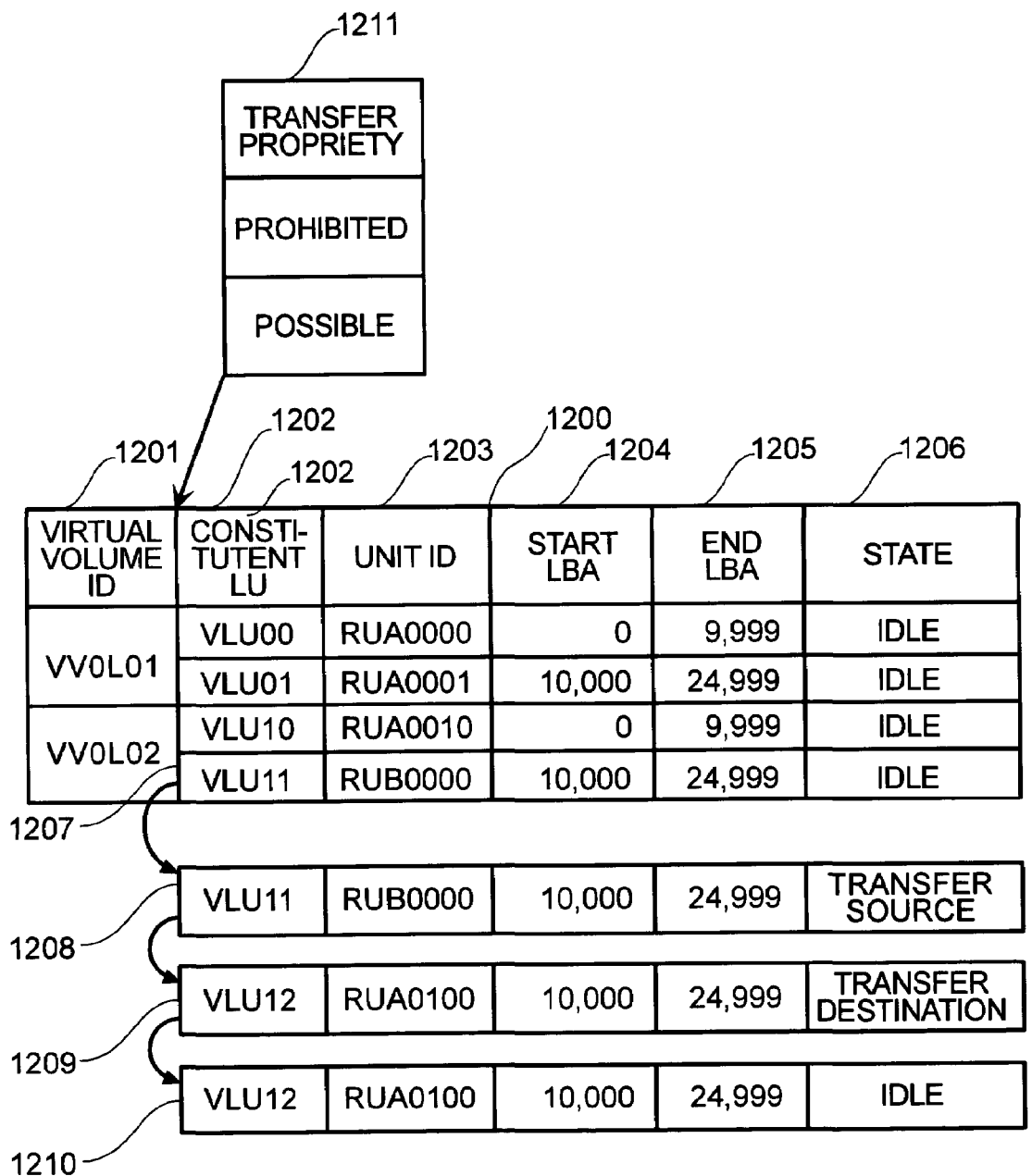
FIG. 12 is a diagram showing an example of a table for managing a state of a logical unit.

FIG. 11 is a diagram showing an example of a processing sequence of the data transfer processing 1007. FIG. 12 is a diagram showing an example of a table 1200 for managing a state of a logical unit in a virtual volume. In the figure, a state 1206 is idle when the virtual volume is not involved in data transfer.

In the processing sequence for obtaining an opportunity for performing data transfer, as shown in FIG. 10, since there is a transfer destination to which data can be transferred in the unit RUA0100, the data transfer processing 1007 sets a logical unit VLU12 having the same size as the logical unit VLU11, as shown in an entry 1209. In this case, the data transfer processing 1007 sets a state field 1206 to indicate transfer destination (step 1101).

In the logical unit VLU11 of a transfer source, the data transfer processing 1007 sets the state field 1206 to indicate transfer source, as shown in an entry 1208 (step 1102).

The processing up to this point corresponds to (1) LU preparation in FIG. 9.

Next, the data transfer processing 1007 transfers data from the logical unit VLU11 of the transfer source to the logical unit VLU12 of the transfer destination (step 1103) and changes a logical unit constituting a virtual volume from the logical unit VLU11 of the transfer source to the logical unit VLU12 of the transfer destination (step 1105).

The processing up to this point is (2) data transfer and (3) logical unit switching in FIG. 9.

Next, in the logical unit VLU12 of the transfer destination, the data transfer processing 1007 sets the state field 1206 to idle, as shown in an entry 1210, and sets the propriety of transfer of a virtual volume VVOL02k to prohibited (step 1106), deletes the logical unit VLU11 of the transfer source (step 1107), and deletes data in the logical unit VLU11 of the transfer source (step 1108).

The processing up to this point is (4) deletion of the logical unit VLU11 and (5) deletion of data in the logical unit VLU11 of FIG. 9. Note that, by not performing (4) deletion of the logical unit VLU11 and (5) deletion of data in the logical unit VLU11, the data transfer processing 1007 may keep the logical unit VLU11 and the data in the logical unit VLU11 for backup temporarily or for a designated period.

Figure 13:
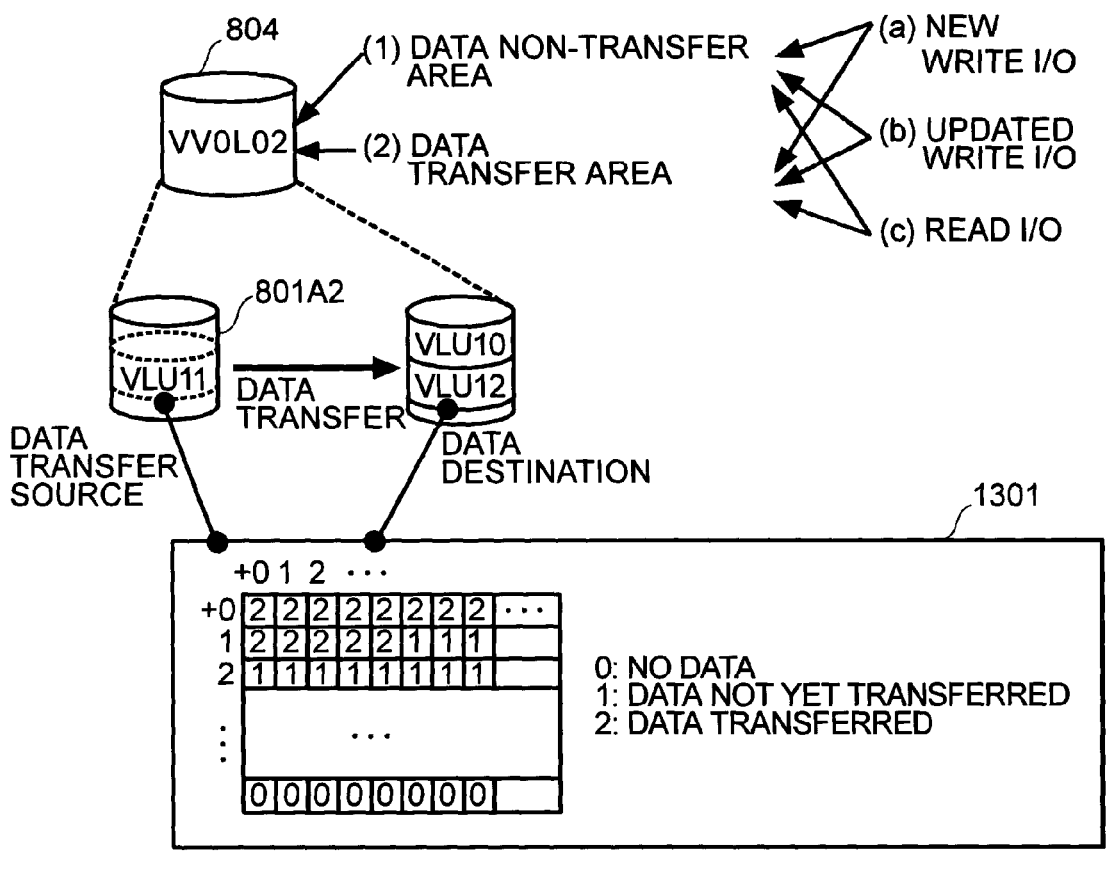
FIG. 13 is a diagram showing an example of a block bitmap table and an I/O processing matrix for performing I/O processing during data transfer.

Since the data transfer processing (step 1103) of FIG. 11 is also required to process data I/O of Read and Write operations during data transfer, as shown in FIG. 13, a block bitmap table 1301 for managing incompletion of data transfer for each block unit is provided.

The data transfer processing transfers data in the unit of a block from the logical unit VLU11 of the transfer source to the logical unit VLU12 of the transfer destination (step 1104A), updates the block bitmap table 1301 (step 1104B), and repeats the same processing until transfer of all data is completed (step 1104C).

The I/O processing during data transfer (step 1109) performs processing as shown in a processing matrix 1302 in FIG. 13. I/O processing 1303 for a data non-transfer area is directly applied to a pertinent memory area, and I/O processing 1304 or 1305 for a data transfer area is applied to a memory area of a logical unit of a data transfer source or a data transfer destination according to the state of the block bitmap table 1301.

In the case in which the structure of the volume management table 208 has been changed by the data transfer processing 212 of the switch manager 140 shown in FIGS. 10 to 13, the volume management table 306 of the routing control 120, the volume management table 507 of the management device 160, and the volume management table 405 of the cooperative server 150 are also changed.

Next, a second embodiment of the present invention will be described with reference to FIGS. 14 to 16. In the second embodiment, a case will be described in which data transfer is performed during operation from one or more memory areas already constituting a virtual volume to another memory area, such that the number of memory areas with a relatively small capacity, not used in the structure of the virtual volume, is reduced.

Figure 14:
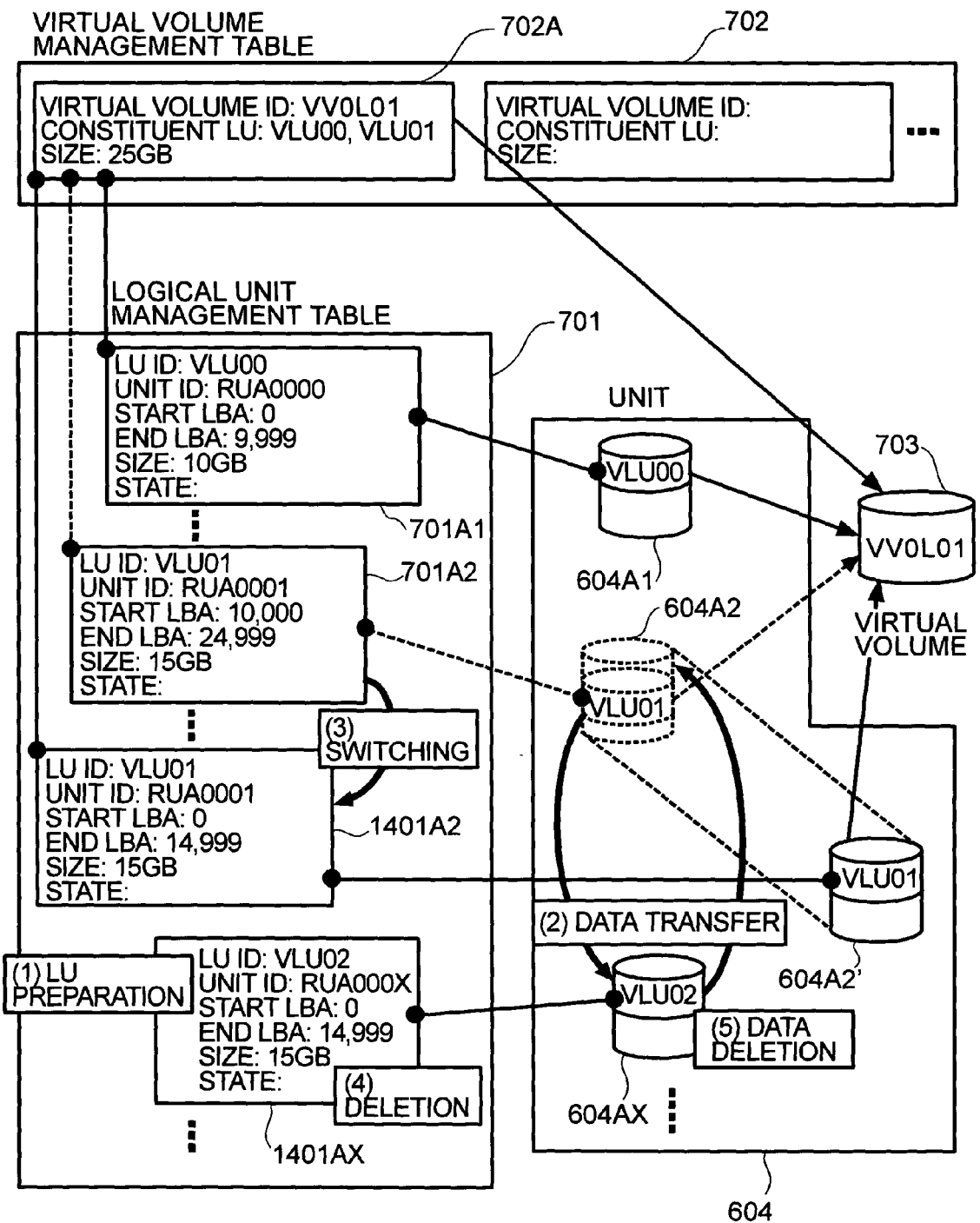
FIG. 14 is a block diagram showing an outline of the process of data transfer.

FIG. 14 is a diagram showing an example of the structure of a logical unit management table and a virtual volume table, which is the same as the example shown in FIG. 7. FIG. 15 is a diagram showing an example of a processing sequence for obtaining an opportunity for performing data transfer. FIG. 16 is a diagram showing an example of a unit usage state management table 213 for managing the easiness of constitution of a unit.

As an example, the easiness of constitution of a unit is "low" in the case in which the number of vacant blocks is less than 7,500, "medium" in the case in which the number of vacant blocks is less than 12,500, and "high" in the case in which the number of vacant blocks is 12,500 or more.

Figure 15:
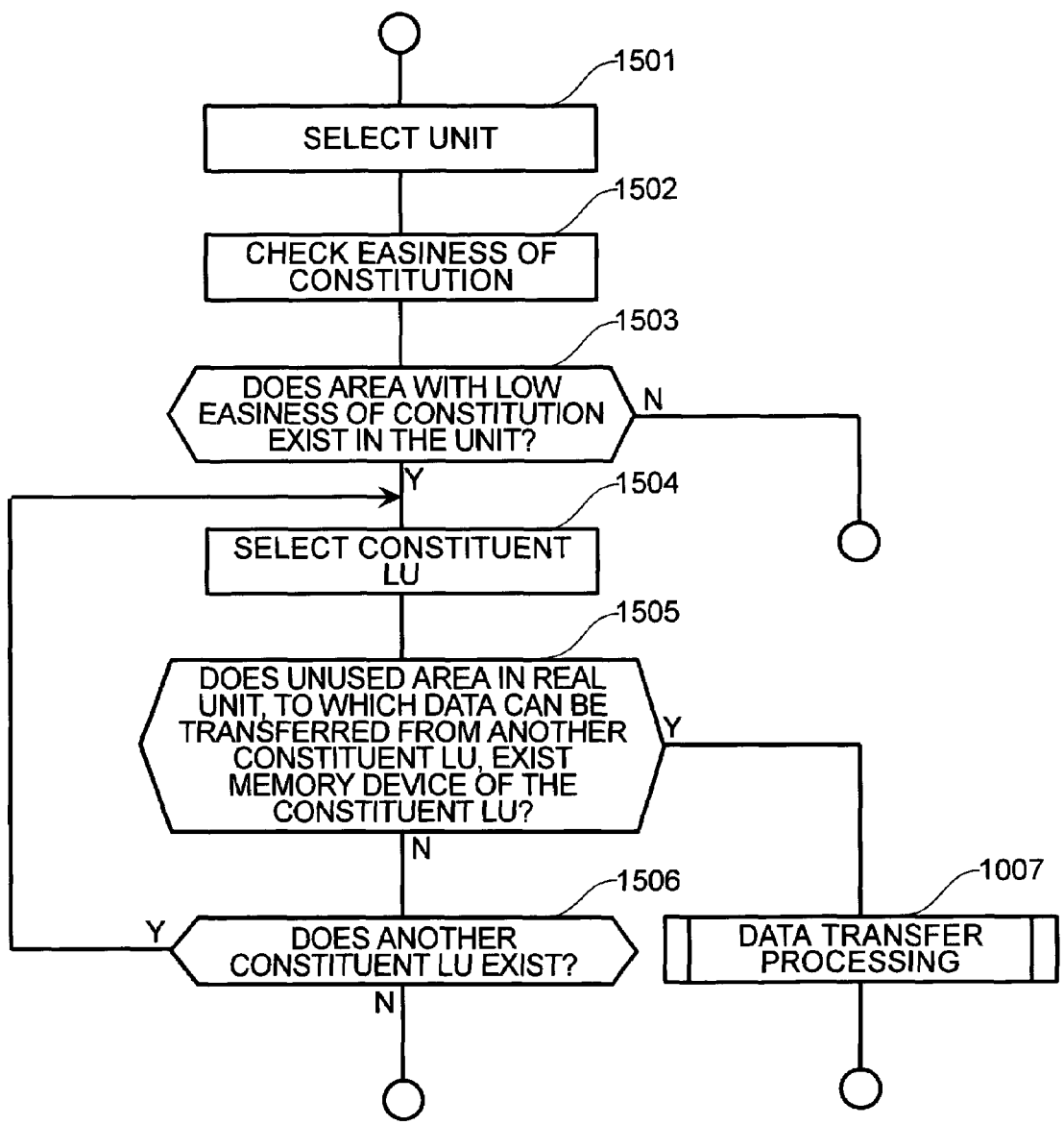
FIG. 15 is a process flow diagram showing an example of a processing sequence in the case in which easiness of constitution of a disk is taken as an opportunity for data transfer.

In the processing sequence of FIG. 15, first data transfer processing selects a unit (step 1501). As an example, it is assumed that the data transfer processing selects a unit RUA0001. (entry 604A2 of FIGS. 6 and 7).

Next, the data transfer processing checks the easiness of constitution of a memory area (step 1502) and proceeds to step 1503.

In step 1503, the data transfer processing judges whether or not an area with low easiness of constitution exists in the selected unit, and, if such an area does not exist, data transfer is not performed. If such an area exists, the data transfer processing proceeds to step 1504. In the case of the example, the data transfer processing checks the easiness of constitution of each memory area of the unit RUA0001. Since it is seen that there are memory areas of "medium" and "low" states in a field of easiness of constitution 1605 in an entry with a unit ID of RUA001 of FIG. 16, the data transfer processing performs processing, which is the same as that of the processing step 1004 and subsequent steps shown in the processing sequence of FIG. 10, in the processing of processing step 1504 and subsequent steps of FIG. 15.

However, the second embodiment is directed to as a case in which, if data of a logical unit of a transfer source cannot be directly transferred to a logical unit of a final transfer destination, the data is first transferred to at least one indirect logical unit, and, then, it is transferred to the final logical unit of the transfer destination.

In FIG. 14, (1) the data transfer processing creates an indirect logical unit VLU02 in a unit RUA000X; (2) after copying data from the logical unit VLU01 of the transfer source in a unit RUA0000 to VLU02 in the unit RUA000X, it copies the copied data of VLU02 in the unit RUA000X to the unit RUA0000, which is a final transfer destination, and sets a new logical unit VLU01 to this copied data; (3)

switches the original logical unit VLU01 to the new logical unit VLU01; (4) deletes the indirect logical unit VLU02; and (5) deletes data in the logical unit VLU02.

Figure 16:
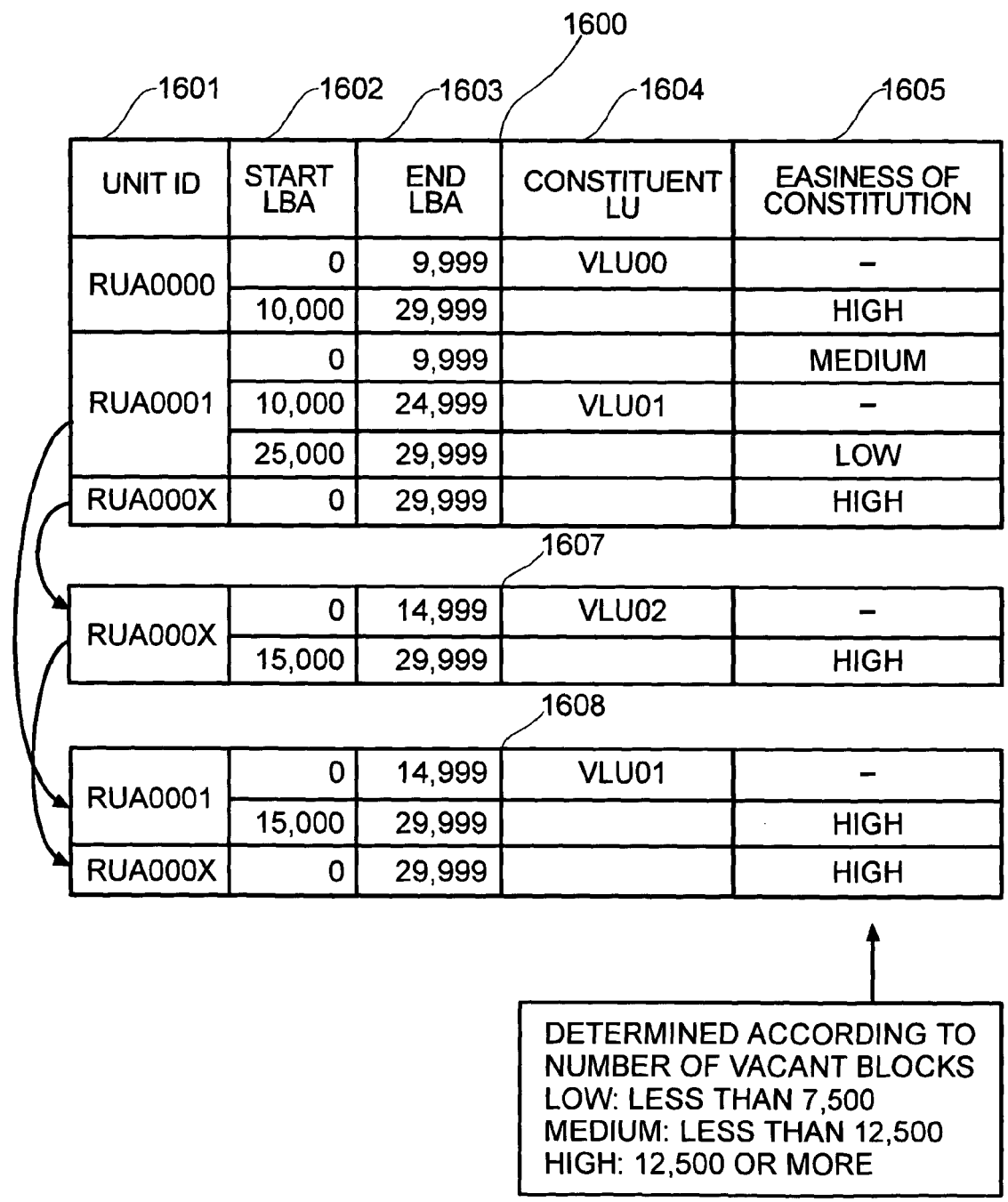
FIG. 16 is a diagram showing an example of the structure of a unit usage state management table.

In FIG. 16, the unit RUA000X is changed as shown in an entry 1607 in (1) of FIG. 14, the units RUA0001 and RUA000X are changed as shown in an entry 1608 in (4) of FIG. 14, and the unit RUA0001 finally has high easiness of constitution.

Next, a third embodiment of the present invention will be described with reference to FIGS. 17 and 18.

In the third embodiment, a case in which main components of a switch are constituted redundantly will be described, and a distribution method of a table from a management device and a synchronization method of a table of a switch control will be described.

Figure 17:
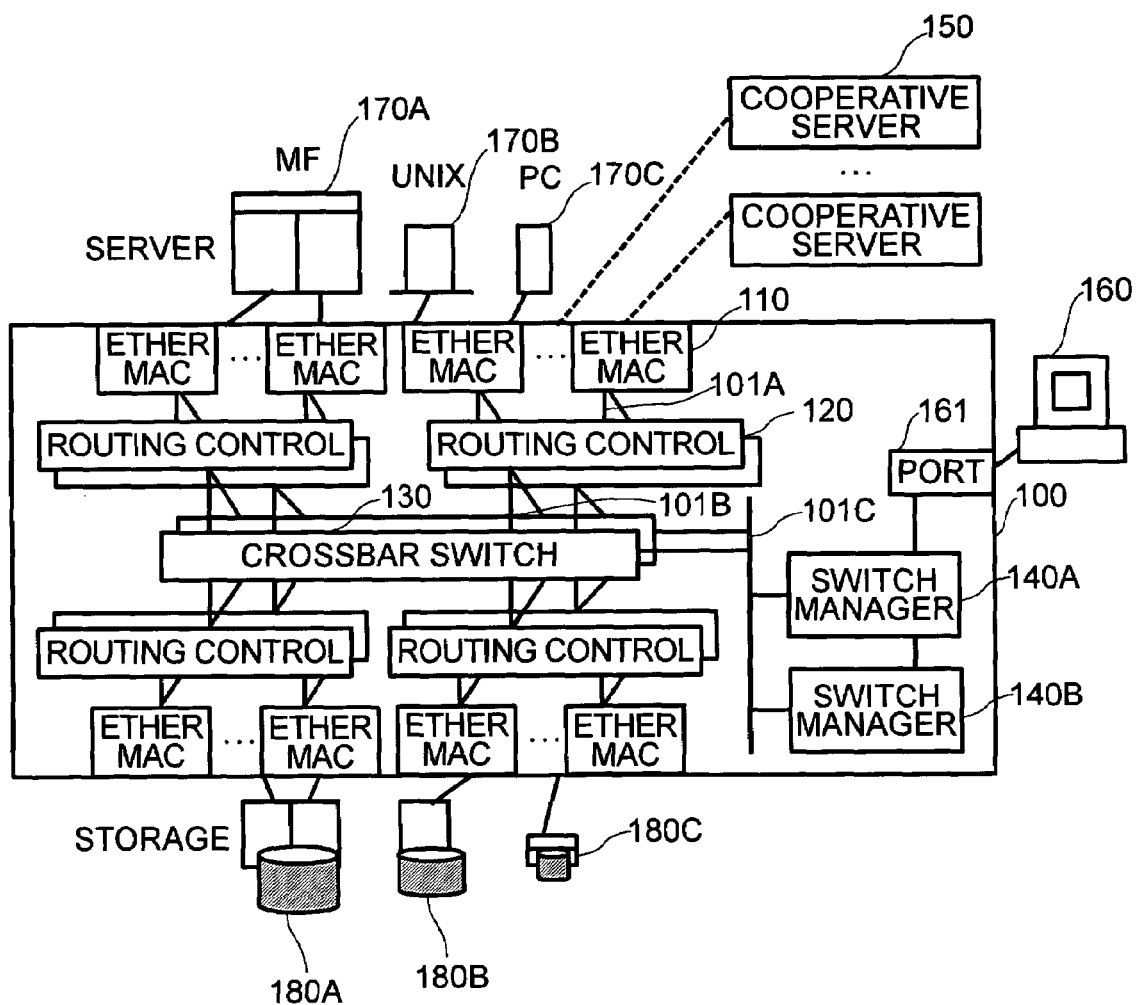
FIG. 17 is a block diagram showing an example of the structure in the case in which main components of a switch are constituted redundantly.

FIG. 17 shows an example of the structure of a computer system in the case in which main components of the switch 100 are constituted redundantly. In FIG. 17, the routing control 120, the crossbar switch 130, and the switch manager 140 are constituted redundantly.

Figure 18:
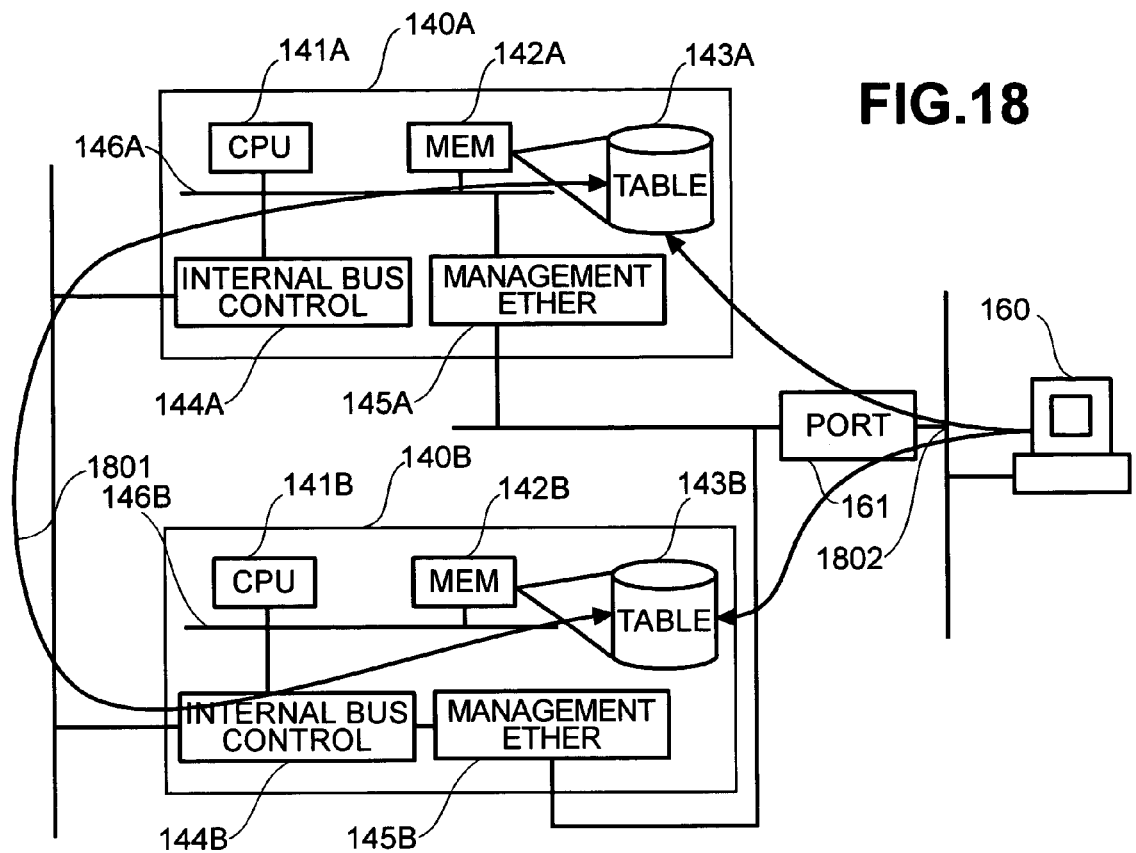
FIG. 18 is a block diagram showing a method of distribution and synchronization of table information of switch managers constituted redundantly.

As provided in the first and second embodiments, the unit management table 600, the logical unit management table 701, and the virtual volume management table 702 are distributed from the management device 160 to switch managers 140A and 140B as indicated by a flow of information 1802 in FIG. 18 and are stored in main memories 142A and 142B.

The switch managers 140 constituted redundantly may operate as an active system and a standby system, or both the switch managers 140 may be active systems to share processing.

In the case in which one system of the switch managers 140 constituted redundantly fails, it is switched to the standby system in the case of the active/standby systems; and, in the case in which both the switch managers 140 are active systems, a degenerate operation is performed.

The tables 143 held by the switch managers 140 constituted redundantly are synchronized, as indicated by a flow of information 1801, whereby it becomes possible to switch the tables 143 at a relatively high speed in the case in which one system fails.

Next, a fourth embodiment of the present invention will be described with reference to FIG. 19. In the fourth embodiment, a case will be described in which data transfer is performed when a switch manager of a switch includes a hard disk.

Figure 19:
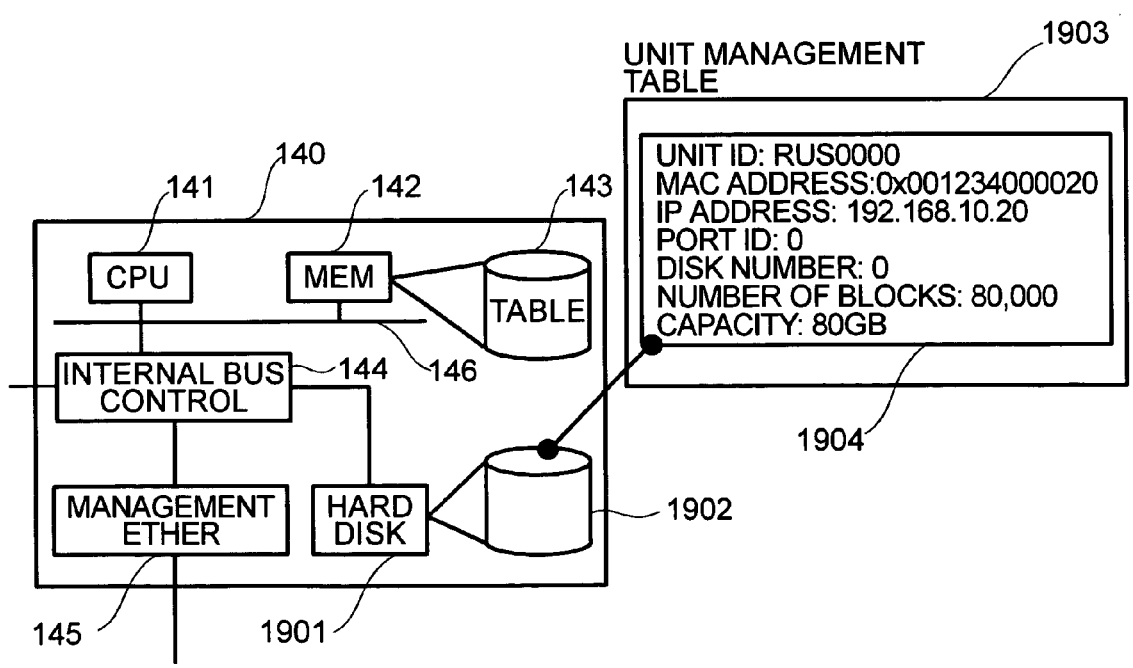
FIG. 19 is a block diagram showing an example of a structure in which the switch manager has a hard disk.

FIG. 19 is a diagram showing an example of a structure in which the switch manager 140 of the switch 100 includes a hard disk 1901. As provided in the first and second embodiments, the hard disk 1901 is also treated as a part of the unit management table 600 (see FIG. 6) to thereby make it possible to create a logical unit and constitute a virtual volume.

As an example, a unit management table 1903 adopts a structure as shown in an entry 1904. An indirect logical unit in transferring data is created in the unit RUS0000, whereby the logical unit can be used in the case in which the memory area of the storage device 180 (see FIG. 1) decreases relatively, and it becomes possible to reduce the number of times data, at the time of data transfer, passes a switch.

According to the present invention, a virtual volume can be constituted by memory areas constituted of the relatively small number of memory devices to reduce the relay processing load on a relay device.

In addition, the number of unused memory areas with a relatively small capacity can be reduced, and, as a result, the number of continuous vacant memory areas with a relatively large capacity can be increased.

What is claimed is:

1. A data transfer method in a computer system, comprising:
   plural computers;
   plural memory devices, each being separate from the others;
   a relay device which connects the computers and the memory devices; and
   a management device which manages the computers, the memory devices, and the relay device,
   wherein the management device sets virtual memory areas of the memory devices for the plural computers and holds first information on contents of the setting for each virtual memory area,
   wherein the relay device holds second information for each virtual memory area, said second information for each virtual memory area being created based upon the first information for the virtual memory area,
   wherein each second information of a corresponding virtual memory area indicates whether data stored in the corresponding virtual memory area can be transferred from a memory device containing said virtual memory area to another memory device,
   wherein each of the virtual memory areas corresponds to memory areas contained in one memory device or corresponds to a memory area formed by combining memory areas contained in plural different memory devices, and
   wherein the relay device selects a virtual memory area based on the second information, determines whether the selected virtual memory area is a virtual memory area formed by a memory area that combines memory areas contained in plural different memory devices, and if the selected virtual memory area is formed by combining memory areas in plural different memory devices and if an unused memory area exists in the memory device containing the selected virtual memory area, performs data transfer of data from a memory area of one of the different memory devices other than the memory device containing the selected virtual memory area to the unused memory area of the memory device containing the selected virtual memory area.

2. A data transfer method according to claim 1, wherein the relay device refers to the second information to perform transfer of data among the plural memory devices, if the memory area of one of the different memory devices other than the memory device containing the selected one virtual memory area has smaller capacity relative to the capacity of the unused memory area of the memory device containing the selected one virtual memory area.

3. A data transfer method according to claim 2, wherein the second information is updated based upon the first information.

4. A data transfer method according to claim 2, wherein, in transferring data among the plural memory devices, third information indicating whether data transfer is incomplete or data has been transferred for each unit of data transfer is set, and the indication that the data transfer is incomplete is changed to an indication that the data has been transferred each time the unit of data transfer is transferred to update a progress state of data transfer.

5. A data transfer method according to claim 3, wherein the second information has a flag indicating a state of whether or not data transfer is in progress for the respective virtual memory areas, and when the computers access the virtual memory areas, if the flag of the virtual memory area corresponding to the second information indicates data transfer in progress the relay device judges which of a data transfer source and a data transfer destination should be accessed according to the third information and does not interrupt data access from the computers to the virtual memory areas during data transfer.

6. A data transfer method according to claim 5, wherein the relay device directly copies data of a memory area, which is a part of the virtual memory areas and for which data transfer is performed, to a memory area of the data transfer destination.

7. A data transfer method according to claim 5, wherein the relay device once copies data of a memory area, which is a part of the virtual memory areas and for which data transfer is performed, to a memory area in the memory device prepared in advance for data transfer and, then, indirectly copies the data to a memory area of the data transfer destination.

8. A data transfer method according to claim 5, wherein the relay device once copies data of a memory area, which is a part of the virtual memory areas and for which data transfer is performed, to an unused memory area of the memory areas of the plural memory devices and, then, indirectly copies the data to a memory area of the data transfer destination.

9. A data transfer method according to claim 5, wherein the relay device keeps data, which is a part of the virtual memory areas at the time of data transfer, in the virtual memory areas before data transfer temporarily or for a designated period even after the data transfer.

10. A data transfer method according to claim 5, wherein the relay device once copies data of a memory area, which is a part of the virtual memory areas and for which data transfer is performed, to a memory area in the relay device prepared in advance for data transfer and, then, indirectly copies the data to a memory area of the data transfer destination.

11. A data transfer method according to claim 1, wherein, in the case in which the relay device in the computer system is constituted redundantly, the management device distributes the first information to all the relay devices and uses the first information as an information source of the second information.

12. A data transfer method according to claim 1, wherein, if components inside the relay device in the computer system are constituted redundantly and components having the second information are constituted redundantly, the second information is always synchronized among the components constituted redundantly, whereby, if one of the components constituted redundantly fails, the relay device uses the second information of the other components constituted redundantly.

13. A computer system comprising:
plural computers;
plural memory devices, each being separate from the others;
a relay device which connects the computers and the memory devices with each other; and
a management device which manages the computers, the memory devices, and the relay device,
wherein the management device sets virtual memory areas of the memory devices for the plural computers and holds first information on contents of the setting for each virtual memory area,
wherein the relay device holds second information for each virtual memory area, said second information for each virtual memory area being created based upon the first information for the virtual memory area,
wherein each second information of a corresponding virtual memory area indicates whether data stored in the corresponding virtual memory area can be transferred from a memory device containing said virtual memory area to another memory device,
wherein each of the virtual memory areas corresponds to memory areas contained in one memory device or corresponds to a memory area formed by combining memory areas contained in plural different memory devices, and
wherein the relay device selects a virtual memory area based on the second information, determines whether the selected virtual memory area is a virtual memory area formed by a memory area that combines memory areas contained in plural different memory devices, and if the selected virtual memory area is formed by combining memory areas of different memory devices and if an unused memory area exists in the memory device containing the selected one virtual memory area, performs data transfer of data from a memory area of one of the different memory devices other than the memory device containing the selected on virtual memory area to the unused memory area of the memory device containing the selected one virtual memory area.

14. A computer system according to claim 13, wherein the relay device refers to the second information to perform transfer of data among the plural memory devices if the memory area of one of the different memory devices other than the memory device containing the selected one virtual memory area has a smaller capacity relative to the capacity of the unused memory area of the memory device containing the selected one virtual memory area.

15. A computer system according to claim 14, wherein the second information is updated based upon the first information.

16. A relay device connecting computers and memory devices with each other, each memory device being separate from the other memory devices, said relay device comprising:
an interface section for making connection with the computers or the memory devices;
a routing control section which performs routing of a packet received from the computers or the memory devices; and
a management section which manages the entire relay device,
wherein the management section holds second information which is created based upon first information on contents of virtual memory areas of the memory devices set for the computers, said second information being created for each virtual memory area,
wherein said second information of a corresponding virtual memory area indicates whether data stored in the corresponding virtual memory area can be transferred from a memory device containing said virtual memory area to another memory device,
wherein each of the virtual memory areas corresponds to memory areas contained in one memory device or corresponds to a memory area formed by combining memory areas contained in plural different memory devices, and wherein the management section selects a virtual memory area based on the second information, determines whether the selected virtual memory area is a virtual memory area formed by a memory area that combines memory areas contained in plural different memory devices, and if, the selected virtual memory area is formed by combining memory areas in different memory devices and if an unused memory area exits in the memory device containing the selected one virtual memory area, performs control of data transfer of data from a memory area of one of the different memory devices other than the memory device containing the selected one virtual memory area to the unused memory area of the memory device containing the selected virtual memory area via the routing control section and the interface section.

17. A relay device according to claim 16, wherein the second information has a flag indicating a state of whether or not data transfer is in progress for the respective virtual memory areas, and when the computers access the virtual memory areas, if the flag of the virtual memory area corresponding to the second information indicates data transfer in progress, the control section judges which of a data transfer source and a data transfer destination should be accessed and dues not interrupt data access from the computers to the virtual memory areas during data transfer.

18. A relay device according to claim 17, wherein the routing control section directly copies data of a memory area, which is a part of the virtual memory areas and for which data transfer is performed, to a memory area of the data transfer destination.

* * * * *